US008548374B2

(12) United States Patent
Preiss et al.

(10) Patent No.: US 8,548,374 B2
(45) Date of Patent: *Oct. 1, 2013

(54) SYSTEM AND METHOD FOR PUSHING INFORMATION FROM A SERVER TO A MOBILE DEVICE

(75) Inventors: Bruno R. Preiss, Waterloo (CA); Giyeong Son, Mississauga (CA); Allan Lewis, New Dundee (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,679

(22) Filed: Sep. 7, 2012

(65) Prior Publication Data

US 2013/0097327 A1    Apr. 18, 2013

Related U.S. Application Data

(63) Continuation of application No. 11/423,538, filed on Jun. 12, 2006, now Pat. No. 8,285,197.

(51) Int. Cl.
*H04H 20/71* (2008.01)
(52) U.S. Cl.
USPC ............ 455/3.01; 455/435.1; 455/414.1; 709/229; 370/328
(58) Field of Classification Search
USPC ............ 455/435.1, 435.2, 435.3, 3.01, 414.1, 455/328; 709/229
See application file for complete search history.

(56) References Cited

U.S. PATENT DOCUMENTS

| 7,155,248 | B2 | 12/2006 | Idnani |
| 8,285,197 | B2 | 10/2012 | Preiss et al. |
| 2003/0026231 | A1 | 2/2003 | Lazaridis et al. |
| 2006/0089999 | A1 | 4/2006 | Xiang et al. |
| 2006/0242310 | A1 | 10/2006 | Quah et al. |
| 2007/0286159 | A1 | 12/2007 | Preiss et al. |

FOREIGN PATENT DOCUMENTS

| EP | 1401176 A2 | 3/2004 |
| WO | 0215554 A1 | 2/2002 |

OTHER PUBLICATIONS

3GPP, IP Based Multimedia Services Framework; Stage 0(Release 5), TR22.941, Nov. 2001.
3GPP, Network architecture (Release 6), TS 23.002, Mar. 2005.
3GPP, Messaging service using IUP Multimedia (IM) Core Network (CN) subsystem; Stage 3 (Release 6), TS 24.247, Mar. 2005.
Extended European Search Report issued on Nov. 16, 2006 in connection with EP 06115278.1.
Extended European Search Report issued on Aug. 3, 2010 in connection with EP 10153370.1.

*Primary Examiner* — Vladimir Magloire
(74) *Attorney, Agent, or Firm* — Ridout & Maybee LLP (57) ABSTRACT

A system is provided for providing content to a plurality of mobile electronic devices, where at least some of the mobile electronic devices have wireless communications capabilities. A first network comprises a wireless network system for communicating with at least some of the mobile electronic devices through wireless sessions; a wired to wireless gateway module connected to the wireless network system for interfacing between a wireless portion of the first network and a wired portion of the first network; a session control module interfacing with the wired to wireless gateway module for managing the wireless sessions and wired sessions; and a relay server module interfacing with the session control module and the wired to wireless gateway module, the relay server module for providing relayed content to the mobile electronic devices. A second network comprises an external server for providing content to the mobile electronic devices.

15 Claims, 6 Drawing Sheets

SYSTEM AND METHOD FOR PUSHING INFORMATION FROM A SERVER TO A MOBILE DEVICE

CROSS-REFERENCE TO RELATED APPLICATIONS

The present application is a continuation application of U.S. patent application Ser. No. 11/423,538, filed Jun. 12, 2006, the contents of which are hereby incorporated herein by reference.

FIELD

The present application relates generally to mobile electronic devices and, more specifically, to a system and method for pushing information from a server to a mobile device.

BACKGROUND

The IP Multimedia Subsystem (IMS) is a reference architecture for the delivery of mobile and fixed IP-based services promulgated by the 3GPP consortium. IMS focuses on services and applications, enabling telephone companies, mobile operators, and other service providers to easily offer rich multimedia services over IP based networks as well as interface with legacy networks. At the highest level, the IMS architecture can be split into a transport plane, a control plane, and a service plane. Mobile devices or user equipment interface with the transport plane, while the control plane mediates signaling between user equipment and application servers that reside in the service plane to implement service related features.

BRIEF DESCRIPTION OF THE DRAWINGS

Reference will now be made to the drawings, which show by way of example, embodiments of the invention, and in which.

In the drawings, like reference numerals denote like elements or features.

DETAILED DESCRIPTION

According to an example embodiment is a system for providing content to a plurality of mobile electronic devices, at least some of the mobile electronic devices having wireless communications capabilities, the system including a first network for use with a second network. The first network includes: a wireless network system for communicating with at least some of the mobile electronic devices through wireless sessions; a wired to wireless gateway module connected to the wireless network system for interfacing between a wireless portion of the first network and a wired portion of the first network; a session control module interfacing with the wired to wireless gateway module for managing the wireless sessions and wired sessions; and a relay server module interfacing with the session control module and the wired to wireless gateway module, the relay server module for providing relayed content to the mobile electronic devices. The second network comprising an external server for providing data content to the mobile electronic devices, the external server communicating directly with either the relay server module or the wired to wireless gateway module.

According to another example embodiment, there is provided a method of electronic device session establishment for use with a communications system, the communications system for providing content to a plurality of mobile electronic devices, at least some of the mobile electronic devices having wireless communications capabilities, the communications system including a first network for use with a second network; the first network having a wireless network system for communicating with at least some of the mobile electronic devices through wireless sessions; a wired to wireless gateway module connected to the wireless network system for interfacing between a wireless portion of the first network and a wired portion of the first network; a session control module interfacing with the wired to wireless gateway module for managing the wireless sessions and wired sessions; and the second network comprising an external server for providing content to the mobile electronic devices through one or more sessions. The method includes: initiating a session establishment request between the electronic device and the session control module; determining session specifications to be applied to the requested session; and establishing the requested session.

IMS does not account for the case where an external server is to provide content to IMS enabled user equipment residing in the transport plane. For example, the external server could be a corporate email server located in an enterprise network, which is outside the IMS domain. Currently, such content provision by an external server would have to be implemented outside of the IMS architecture by using an application server in the IMS service plane that acts as a service gateway to the external server. The external server would then push information to the service gateway and the service gateway would then push the information through the layers of the IMS domain to the user equipment. The method of communication between the external server and the service gateway is outside the scope of the IMS reference architecture, which causes several problems, such as the use of ad hoc implementations and non-standard or unsupported protocols. Such implementations do not provide the benefits that a tight integration with IMS would provide (e.g., security, billing, and management related provisions). Secondly, these ad hoc connections can be a burden for the IMS network operator to manage, especially if they are significant in numbers. Accordingly, adaptations of the IMS to address the issues identified above are desirable.

Figure 1:
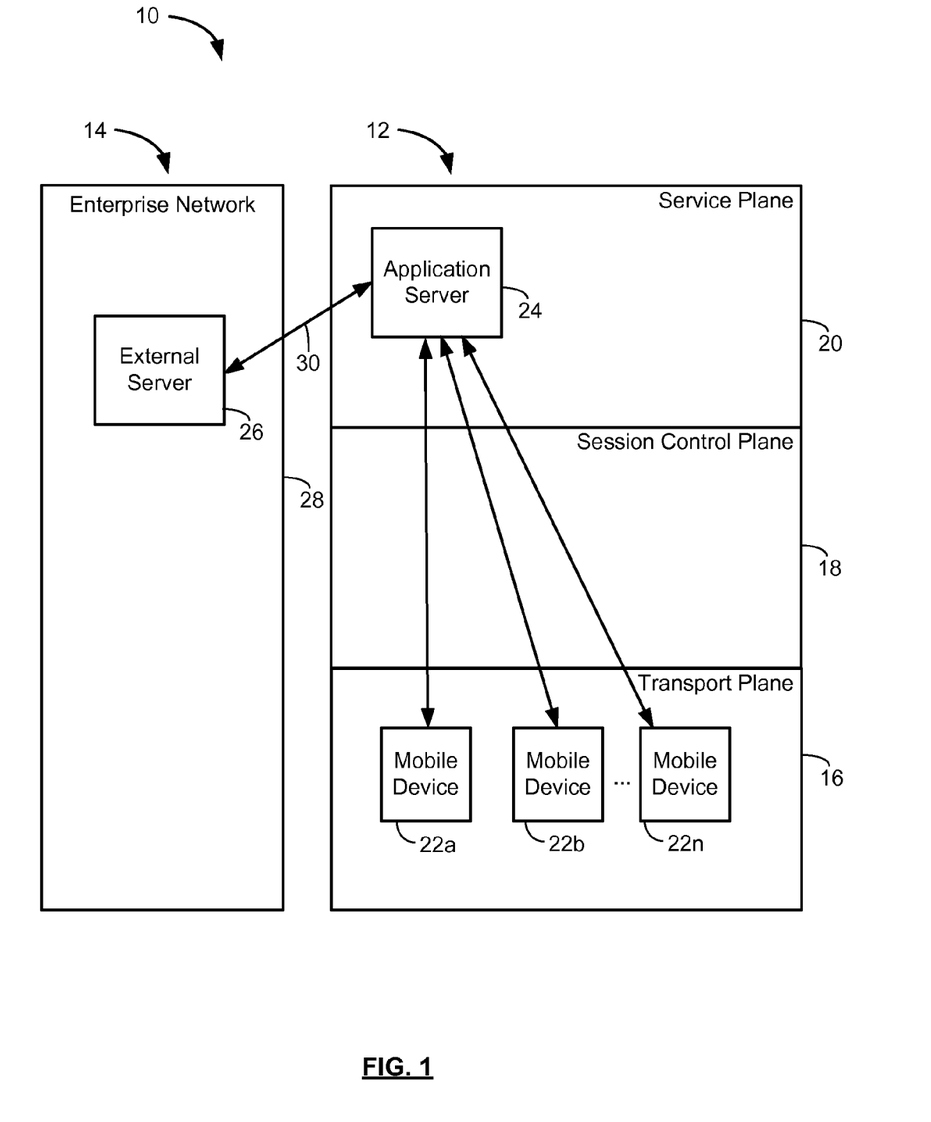
FIG. 1 shows in block diagram form the network topology of an external server configured to provide content to an IMS enabled application server for provision to user equipment according to conventional IMS protocol.

Reference is first made to FIG. 1, which shows in block diagram form the network topology of a system 10 including an external server configured to provide content to an IP Multimedia Subsystem (IMS) enabled application server according to conventional IMS protocol. Hardware included in the system 10 can be divided into two groups: hardware conforming to the IMS architecture, generally indicated by reference 12, and external hardware not conforming to the IMS architecture, generally indicated by reference 14. At the highest level of abstraction, the IMS architecture may be split into a transport plane 16, a session control plane 18, and a service plane 20. User equipment such as mobile devices 22a-n, individually indicated as 22a, 22b, . . . 22n, interface with the transport plane 16, while the control plane 18 mediates signaling between the mobile devices 22 and an application server 24 that resides in the service plane 20. Generally, an IMS compliant network having hardware residing in the service plane 20, the session control plane 18, and the transport plane 16 is owned and operated by a number of network service providers and only the mobile devices 22 are owned by end users. However, situations arise where an organization associated with the end users may wish to directly provide content to the mobile devices 22 belonging to the end users. If an external server 26, such as a corporate mail server residing in a private enterprise network 28, is to provide content to IMS enabled user equipment residing in the transport plane 16, such content provision by the external server 26 would have to be indirectly implemented in the IMS architecture by using the application server 24 in the IMS service plane 20 as a service gateway to the IMS domain. The external server 26 pushes information to the service gateway running on the application server 24 over a connection 30 and the service gateway then pushes the information through the session control plane 18 and through the transport plane 16 to the users of the mobile devices 22. The method of communication implemented on the connection 30 is outside the scope of the IMS reference architecture, which causes several problems, such as the use of ad hoc and non-standard implementations. Such implementations do not provide the benefits that an IMS compliant external server implementation would provide when properly configured if IMS included provisions for external servers, which it does not. IMS provides security, billing (e.g., bandwidth usage related), and management related provisions (e.g., Quality of Service specifications) that greatly simplify network administration. These provisions are not available to implementations such as the connection 30.

Figure 2:
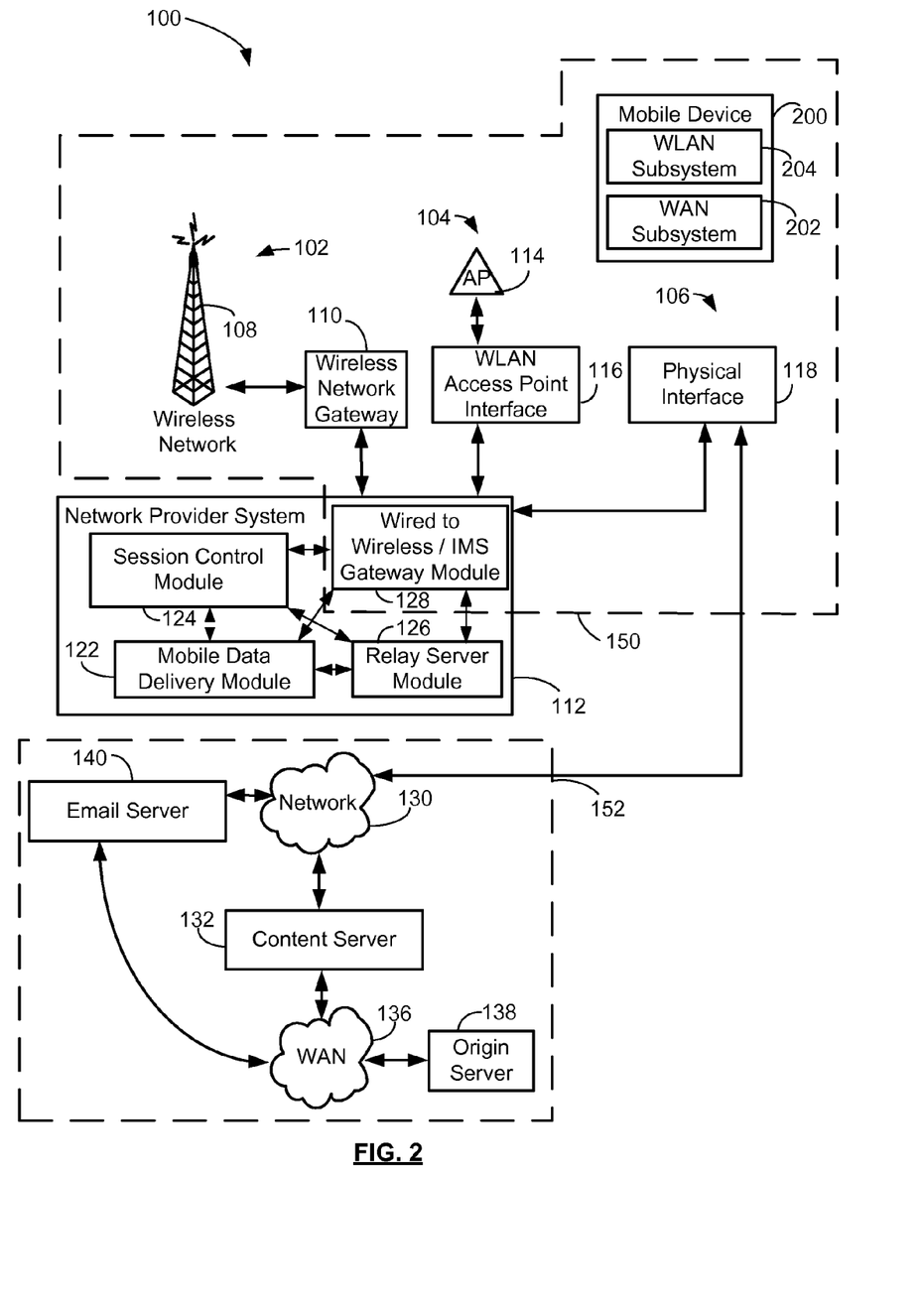
FIG. 2 shows in block diagram form a communication system suitable for application to a modified IMS configuration in accordance with one embodiment.

Reference is next made to FIG. 2, which shows a communication system 100 suitable for application to a modified IMS configuration, which will be described in greater detail in connection with FIG. 4. The communication system 100 generally includes one or more mobile electronic devices 200 (only one of which is shown in FIG. 1), a wireless Wide Area Network (WAN) 102, a Wireless Local Area Network (WLAN) 104, and/or other interfaces 106.

Referring to FIG. 2, the wireless WAN 102 may be implemented as a packet-based cellular network that includes a number of base stations 108 (one of which is shown in FIG. 2) where each of the base stations 108 provides wireless Radio Frequency (RF) coverage to a corresponding area or cell. The wireless WAN 102 is typically operated by a cellular network service provider that sells subscription packages to users of the mobile electronic devices 200. The wireless WAN 102 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution) or UMTS (Universal Mobile Telecommunications Systems).

As shown in FIG. 2, the communications system 100 also includes a wireless network gateway 110 and one or more network provider systems 112. The wireless network gateway 110 provides translation and routing services between the network provider system(s) 112 and the WAN 102 which facilitates communication between the mobile electronic devices 200 and other devices (not shown) connected, directly or indirectly, to the network provider system 112.

The WLAN 104 comprises a network which in some examples conforms to IEEE 802.11 standards such as 802.11b and/or 802.11g; however, other communications protocols may also be used for the WLAN 104. The WLAN 104 includes one or more wireless RF Access Points (AP) 114 (one of which is shown in FIG. 2) that collectively provide a WLAN coverage area. For the embodiment depicted in FIG. 2, the WLAN 104 is operated by an enterprise (for example, a business or university) and the access points 114 are connected to an access point (AP) interface 116. The AP interface 116 provides translation and routing services between the access points 114 and the network provider system 112 to facilitate communication between two or more of the mobile electronic devices 200 and other devices connected, directly or indirectly, to the network provider system 112. The AP interface 116 is implemented using a computer, for example, a server running a suitable computer program or software.

According to one embodiment, the other interfaces 106 may be implemented using a physical interface indicated by the reference 118. The physical interface 118 includes an Ethernet, Universal Serial Bus (USB), Firewire, or infrared (IR) connection implemented to exchange information between the network provider system 112 and the mobile electronic device 200.

The network provider system 112 comprises a server or a number of servers which are located behind a firewall (not shown). The network provider system 112 includes a number of modules including a mobile data delivery module 122, a session control module 124, a relay server module 126, and a wired to wireless gateway and IMS module 128. In one embodiment, the various modules may be implemented as a number of services running on a single server or as a number of interconnected servers each running a software program to implement the functionality of the respective module. The network provider system 112 provides access for the mobile electronic devices 200, through either the wireless WAN 102, the WLAN 104, or the other connection 106 to the devices connected, for example, through an enterprise network 130 (e.g., an intranet), to the network provider system 122. In one embodiment, the data delivery module 122, the session control module 124, the relay server module 126 and the wired to wireless gateway and IMS module 128 are implemented on a computer, such as the network provider system 112.

The enterprise network 130 may be connected to the network provider system 112 through the Internet, an intranet or a direct connection, such as the physical interface 118. According to one embodiment, the enterprise network 130 comprises an intranet for a corporation or other type of organization. In at least some example embodiments, the network provider system 112 is part of the enterprise network 130, and is located behind a corporate firewall and connected to the wireless network gateway 110 through the Internet. As shown in FIG. 2, an application/content server 132 may be connected to and included within the enterprise network 130 and may also be connected to another network, for example a Wide Area Network (WAN), indicated by reference 136. The WAN 136 may further connect to other networks. In example embodiments, the WAN 136 can include the Internet, a direct connection, a LAN, a wireless communication link, or any combination thereof. Content providers, such as Web servers, may be connected to the WAN 136, an example of which is shown in FIG. 2 as an origin server, indicated by reference 138. In one example configuration, an email server 140 is connected to and included within the enterprise network 130. The email server 140 is configured to direct or redirect email messages received over the WAN 136 and internally within the enterprise network 130 to be addressed to the mobile electronic device(s) 200.

According to one embodiment, the mobile data delivery module 122, the wired to wireless gateway and IMS module 128, and the relay server module 126 may individually or collectively provide HTTP connectivity between each of the wireless WAN 102, the WLAN 104 and the other connection 106, and devices and/or networks connected directly or indirectly to the network provider system 112. The network 130, the application/content server 132, the WAN 136, and the origin server 138 are individually and/or collectively in various combinations a content source for the network provider system 112. It will be appreciated that the system shown in FIG. 2 comprises one possible communication network or configuration for use with the mobile electronic devices 200.

The mobile electronic devices 200 are configured to operate, as described above with reference to FIG. 2, within the wireless WAN 102 and the WLAN 104. As shown in FIG. 2, the mobile electronic device 200 is configured with or includes a WAN communications subsystem 202 for communicating with the wireless WAN 102 and a WLAN communications subsystem 204 for communicating with the access points 114 of the WLAN 104.

In one embodiment, the communications system 100 may be configured to implement a modified version of an IMS compliant architecture. Generally, the transport plane, indicated by reference box 150, is implemented by some components of the system 100 residing within the box 150, and the hardware external to the IMS architecture is indicated by reference box 152. The servers and modules that form part of the network provider system 112 may be configured to collectively implement various aspects of the session control plane and the service plane of the IMS architecture, and may fall either inside or outside of the area 150 (i.e., the transport plane) depending on the specific configuration chosen for the system 100. The configuration of the system 100 to provide an IMS compliant architecture is further described below in connection with FIG. 4.

Figure 3:
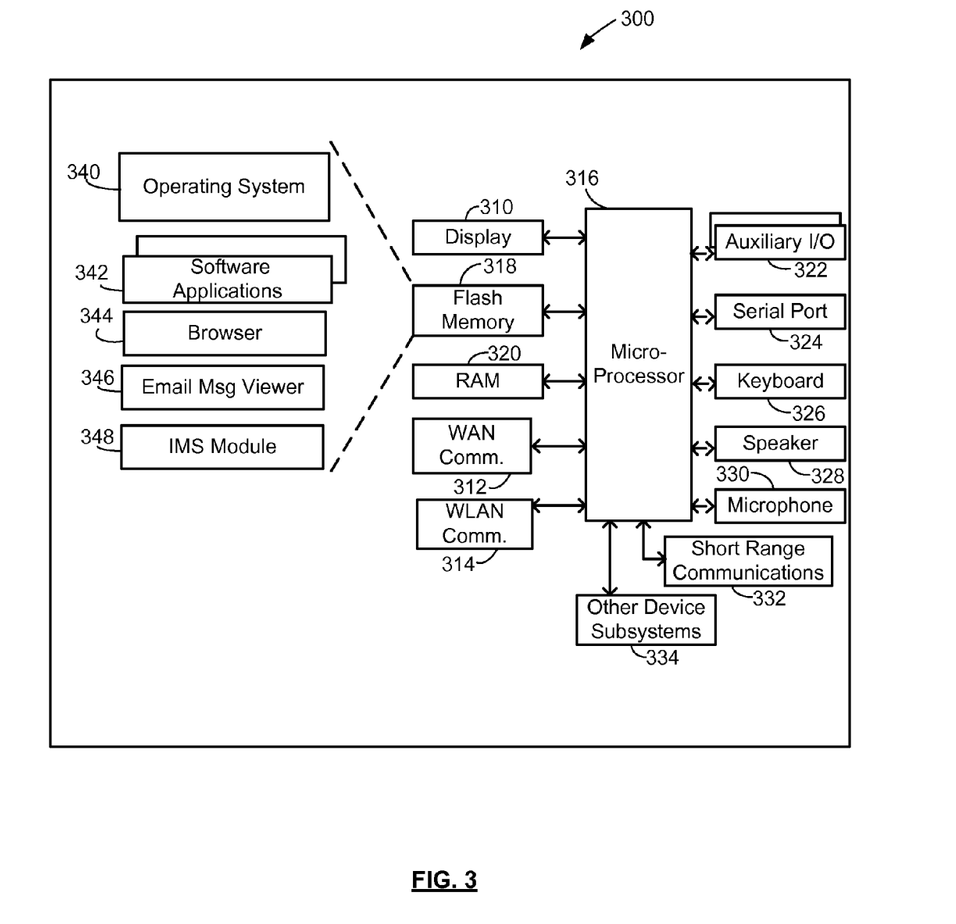
FIG. 3 shows in diagrammatic form a mobile electronic device suitable for application to a modified IMS configuration in accordance with one embodiment.

Reference is next made to FIG. 3, which shows an embodiment of the mobile electronic device suitable for application to a modified IMS configuration and is indicated generally by reference 300. The mobile electronic device 300 includes a display module 310, a wireless WAN communication subsystem 312 for two-way communications with the wireless WAN 102 (FIG. 2), and a WLAN communications subsystem 314 for two-way communications with the WLAN 104 (FIG. 2). According to one embodiment, the communications subsystems 312 and 314 include respective antennas (not shown), RF transceivers (not shown), and some signal processing capabilities, implemented, for example, by a digital signal processor (not shown). In various embodiments of the mobile electronic device 300, either none, one, or both of the wireless WAN communication subsystem 312 and the WLAN communications subsystem 314 may be present. The mobile electronic device 300 also includes a microprocessor 316 which is suitably programmed to control the overall operation and functions of the mobile electronic device 300, which are described in more detail below. The mobile electronic device 300 includes peripheral devices or subsystems such as a flash memory 318, a random access memory (RAM) 320, an auxiliary input/output (I/O) subsystem 322 (e.g., an external communications link such as Ethernet), a serial port 324 (e.g., a USB port), an input device 326 (e.g., a keyboard or keypad), a speaker 328, a microphone 330, a short-range communications subsystem 332 (e.g., an infrared transceiver, wireless bus protocol such as a Bluetooth system, or any other means of local wireless communications), and any other device subsystems generally designated by reference 334.

The microprocessor 316 operates under stored program control with code or firmware being stored in the flash memory 318 (or other type of non-volatile memory device or devices). The flash memory 318 includes stored programs (e.g., firmware) including an operating system program or code module 340 and other programs or software applications indicated generally by reference 342. The software applications 342 for a Web-enabled embodiment or implementation of the mobile electronic device 300 comprise a Web browser 344 and an email message viewer 346. The software applications 342 for IMS compliant versions of the mobile electronic device 300 include an IMS module 348, for negotiating and managing IMS compliant sessions with a communications system such as the system 100 shown in FIG. 2. Each of the software applications 342 may include layout information defining the placement of particular fields, such as text fields, input fields, etc., in a user interface for the software applications 342. The operating system code 340, code for specific device applications 342, or code components thereof may be temporarily loaded into a volatile storage medium such as the RAM 320 during operation of the mobile electronic device 300. Received communication signals and other data with information may also be stored in the RAM 320.

The stored program control (i.e., software applications 342) for the microprocessor 316 also includes a predetermined set of applications or code components or software modules that control basic device operations, for example, data and voice communication related applications such as the IMS module 348, which are normally installed on the mobile electronic device 300 as the software applications 342 during the manufacturing process. Further applications may also be loaded (i.e., downloaded) onto the mobile electronic device 300 through the operation of networks described above for FIG. 2, the auxiliary I/O subsystem 322, the serial port 324, or the short-range communications subsystem 332. The downloaded code module or components are then installed by the user (or automatically) in the RAM 320 or the non-volatile program memory (e.g., the flash memory 318). The serial port 324 comprises a USB type interface port for interfacing or synchronizing with another device, such as, a desktop computer (not shown). The serial port 324 is used to set preferences through an external device or software application. The serial port 324 is also used to extend the capabilities of the mobile electronic device 300 by providing for information or software downloads, including user interface information, to the mobile electronic device 300 other than through a wireless communication network, described above for FIG. 2.

In example embodiments, a session represents an association between participants for the purpose of exchanging data. In one example, a telephone call is a session involving two participants for the purpose of exchanging voice data. A session also has a lifetime. In general, a session involves one or more participants and participants may join and leave a session over time. A participant may also be involved in one or more sessions at a time. Non exhaustive examples of sessions to which described embodiments may apply include sessions in the sense of an IMS session or a SIP session.

Figure 4:
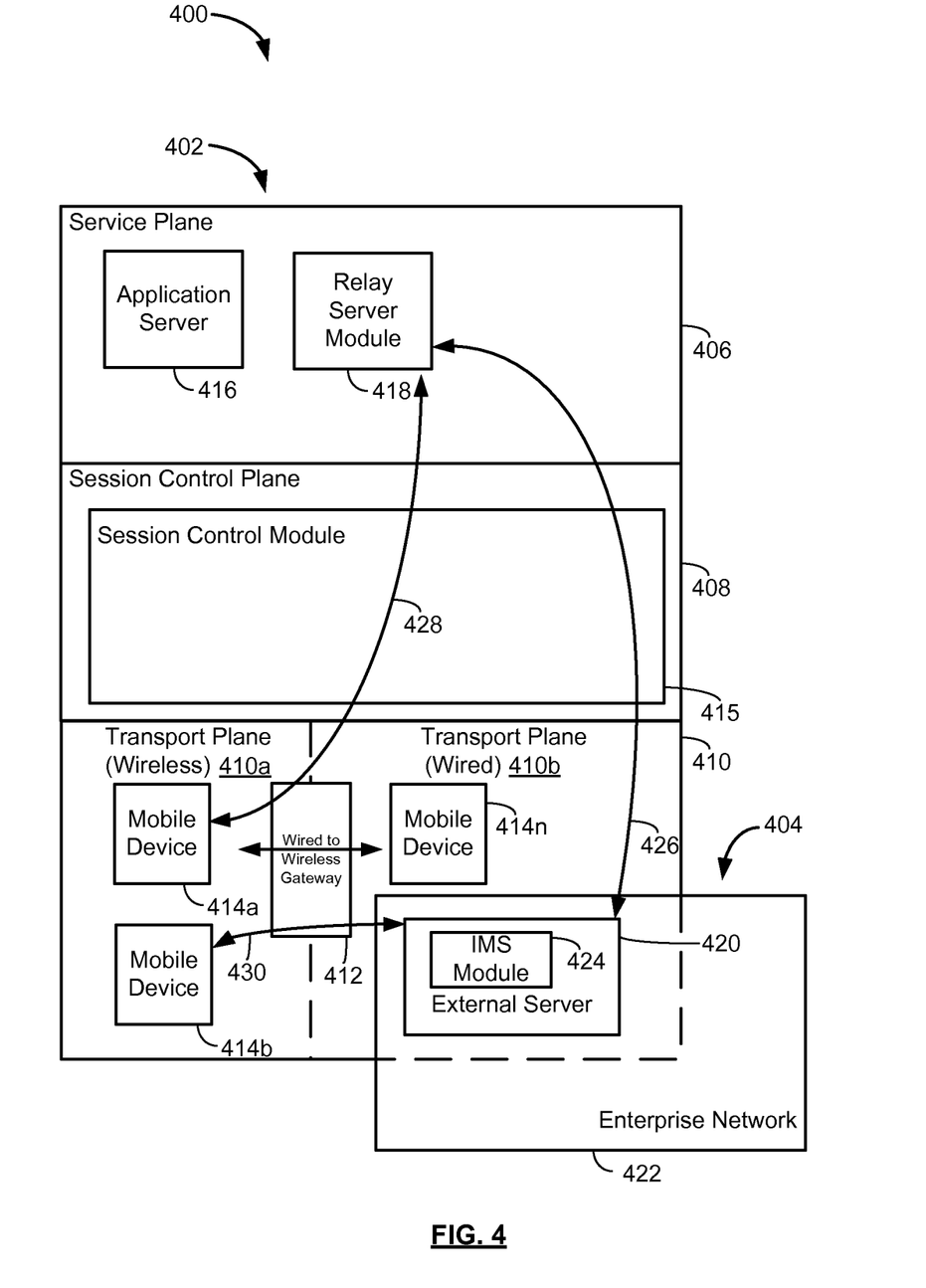
FIG. 4 shows in block diagram form one embodiment of a modified IMS network configuration including at least part of the communication system shown in FIG. 2 and the mobile electronic device shown in FIG. 3.

Reference is next made to FIG. 4, which shows in block diagram form a system 400 implementing a modified IMS network configuration including an external server configured to be IMS compliant and to provide content to mobile devices and/or an application server according to one embodiment. Hardware included in the system 400 can be divided into two groups: hardware conforming to the IMS architecture, generally indicated by reference 402, and external hardware not conforming to the IMS architecture, generally indicated by reference 404. The IMS architecture may be viewed as being split into three planes: a service plane 406, a session control plane 408, and a transport plane 410. In one embodiment, the transport plane 410 is further split into two separate planes, a wireless transport plane 410a for interfacing with wireless user equipment and a wired transport plane 410b for interfacing with user equipment physically connected to the system 400. The wireless transport plane 410a and the wired transport plane 410b are interconnected by a wired to wireless gateway 412. User equipment such as mobile electronic devices 414a-n, individually indicated as 414a, 414b, . . . 414n, interface with the transport plane 410, while a session control module 415 in the session control plane 408 mediates signaling between the mobile electronic devices 414 and an application server 416 and/or a relay server module 418 that reside in the service plane 406. In one embodiment, the relay server module 418 may be implemented as a server functioning as a relay server, also referred to as a session redirect server. In one embodiment, the wired to wireless gateway 412 facilitates direct communication between wireless devices and wired devices residing in the transport plane 410, such as between the mobile electronic device 414a and the mobile electronic device 414n. In another embodiment, the wired to wireless gateway 412 is the bridge that extends IMS compliant communications into the wireless world, allowing wireless devices such as the mobile electronic devices 414a and 414b to interface with components of the transport plane 410.

According to one embodiment, in a converged wired/wireless IMS deployment, a corporate server, such as an external server 420, forming part of an enterprise network 422 is configured to be, from the perspective of the IMS reference architecture, a piece of user equipment. Configuring the external server 420 as user equipment means that, in the present example and from the perspective of the IMS reference architecture, the external server 420 is a peer to the mobile electronic devices 414. As a result, the dynamics of the communication between the external server 420 and mobile electronic devices 414 changes from a server-to-client push methodology, as shown in FIG. 1, to a peer-to-peer push methodology, as shown in FIG. 4. The external server 420 has an IMS module 424 responsible for coordinating the IMS compliant aspect of the communications to and from the external server 420 when the external server 420 is communicating with devices within the system 402. In one embodiment, the external server 420 sends and receives communications to and from the mobile electronic devices 414, such as the mobile electronic device 414a, through the relay server module 418 using a first connection 426 between the external server 420 and the relay server module 418 and a second connection 428 between the relay server module 418 and the mobile electronic devices 414. In another embodiment, the external server 420 requests a direct connection with one of the mobile electronic devices 414 (e.g., the mobile electronic device 414b) from the relay server module 418 (e.g., using the connection 426) and the relay server module 418 then coordinates establishment of a direct connection, such as a direct connection 430, which uses the wired to wireless gateway 412. In this embodiment, the relay server module 418 acts as a session redirect server. As such, the session control module 415 asks the relay server to inform the session control module 415 about where session establishment requests are to be directed. The relay server module 418 provides information to the session control module 415 of the target external server (such as the external server 420) and its identifier and address. Next, the session control module 415 sends the external server the session request. In yet another embodiment, the external server 420 requests a direct connection with one of the mobile electronic devices 414 (e.g., the mobile electronic device 414b) directly from the session control module 415 and the session control module 415 then coordinates establishment of a direct connection, such as a direct connection 430, which uses the wired to wireless gateway 412. In this embodiment where the relay server module 418 is not used, the device requesting the session must specify the target with which the session is requested. In other embodiments, the relay server module 418 may not be present or in use and the session control module 415 may implement at least some of the functions of the relay server module 418.

Configuring the external server 420 as user equipment has a number of possible results, the first of which brings the external server 420 under the IMS umbrella. For example, the network 130 shown in FIG. 2 may now be directly connected to the wired to wireless and IMS gateway 128 with any of the servers 140, 132, and/or 138 configured as user equipment in the transport plane 410 (i.e., the transport plane 150 in FIG. 1). This means that the connection between the external server 420 and the IMS architecture 402 (e.g., the connections 426 and 430) benefits from all the IMS features that are available under the IMS specification, such as security and billing provisions. In particular, management of the external server 420 is simplified because the same IMS provided methods used to manage the connections with the mobile electronic devices 414 can be used to manage the connections with the external server 420. In this approach, push-based delivery of information from the external server 420 to the mobile electronic devices 414 may be mediated by an application server such as the relay server module 418 or the session control module 415, with the external server 420 now being viewed as an IMS compliant piece of the overall IMS framework. Where there are numerous external servers such as the external server 420 providing content to various mobile electronic devices 414, the addition of the external servers under the IMS umbrella greatly simplifies the job of the administration of the system 400 because all external servers are connected to the system 400 with IMS compliant connections, as opposed to countless proprietary connections as may be the case using the system 10 shown in FIG. 1.

A number of interaction models for communications occurring between the external server 420 and devices within the IMS architecture 402 and between the mobile electronic devices 414 and devices within the IMS architecture 402 are possible. In one embodiment, permanent sessions may be established between the external server 420 and the relay server module 418 and/or between the mobile electronic devices 414 and the relay server module 418. In this embodiment, once connections are established with the relay server module 418, the connections remain established until intentionally terminated by a user of one of the mobile electronic devices 414 or by a network administrator of software running on the external server 420. In this embodiment, only one connection between the external server 420 and the relay server module 418 may be needed to service all of the mobile electronic devices 414. The IMS bearer channel for this permanent session is used to push information to the relay server module 418. For example, in the case of one of the mobile electronic devices 414a, the bearer channel used by the external server 420 may be based on TCP with a certain message format and/or type. Similarly, the mobile electronic device 414a may request establishment of a permanent session between the mobile electronic device 414a and the relay server module 418 when the mobile electronic device 414a is turned on. The bearer channel for the session between the mobile electronic device 414a and the relay server module 418 is used to push information from the relay server module 418 to the mobile electronic device 414a. For example, in the case of the mobile electronic device 414a service, the bearer channel may be based on UDP with another message format and/or type. Where the external server 420 communicates with the mobile electronic devices 414 via the relay server module 418, a different protocol may be used for the connection 426 between the external server 420 and the relay server module 418 and the connections between each of the mobile electronic devices 414 and the relay server module 418 (e.g., the connection 428). In one embodiment, reverse information flows (e.g., bidirectional communications) from the mobile electronic device 414a to the relay server module 418 and on to the external server 420 are also supported. In this case, the mobile electronic devices 414 may request session establishment between themselves and the relay server module 418 when the mobile electronic devices 414 have information to send to the external server 420, if a permanent session is not already established.

In another embodiment, transient sessions are established between the external server 420 and the relay server module 418 and/or between the mobile electronic devices 414 and the relay server module 418. In this embodiment, the external server 420 and the mobile electronic devices 414 do not establish permanent sessions. Instead, the external server 420 requests establishment of a transient session between the external server 420 and the relay server module 418 when the external server 420 has information to push to a particular one of the mobile electronic devices 414. In this embodiment, a session is established between the external server 420 and the relay server module 418 for each of the mobile electronic devices for which the external server 420 has information to deliver. Similarly, the relay server module 418 requests establishment of a transient session between the relay server module 418 and one of the mobile electronic devices 414 (e.g., 414a) when the relay server module 418 has information to push to the mobile electronic device 414a. In this embodiment, the information to be pushed could be sent in the signaling channel (e.g., in a SIP message body) or in the bearer channel. Reverse information flows from the mobile electronic device 414a to the relay server module 418 to the external server 420 are also possible. In this case, the mobile electronic devices 414 may request session establishment between themselves and the relay server module 418 when the mobile electronic devices 414 have information to send to the external server 420. In this embodiment, the mobile electronic devices 414 would perform the session establishment request each time the mobile electronic devices 414 have information to send to the external server 420.

In another embodiment, separate sessions are provided between the external server 420 and the relay server module 418 and between the mobile electronic devices 414 and the relay server module 418. Sessions established between the mobile electronic devices 414 and the relay server module 418 may be initiated by either the mobile electronic devices 414 or the relay server module 418. Likewise, sessions established between the relay server module 418 and the external server 420 may be initiated by either the relay server module 418 or the external server 420. The lifetimes of the sessions (e.g., a first session between the relay server module 418 and the external server 420 and second sessions between the mobile electronic devices 414 and the relay server module 418) are independent, being either permanent or transient, with transient sessions being of any desirable and suitable duration. In one example, a permanent external server 420 to relay server module 418 session is established by the external server 420 and transient mobile electronic devices 414 to the relay server module 418 sessions are established, as needed, by either the mobile electronic devices 414 or the relay server module 418.

The embodiments described with reference to FIG. 4 differ from the approach described in relation to FIG. 1 in that the external server 420 is configured as user equipment and interfaces directly with elements of the transport plane 410 and not directly with elements of the service plane 406. Using this approach, the role of the external server 420 is mapped onto the IMS reference architecture as user equipment. In one embodiment, this mapping is provided by introducing the use of the relay server module 418 onto the service plane 406 of the IMS reference architecture. In one embodiment, the relay server module 418 may provide protocol translations which allow the relay server module 418 to use one protocol to communicate with the external server 420 and other protocols to communicate with the mobile electronic devices 414. The relay server module 418 may also implement wireless network specific protocol adaptations which improve performance and reliability in the wireless transport plane 410a.

Figure 5:
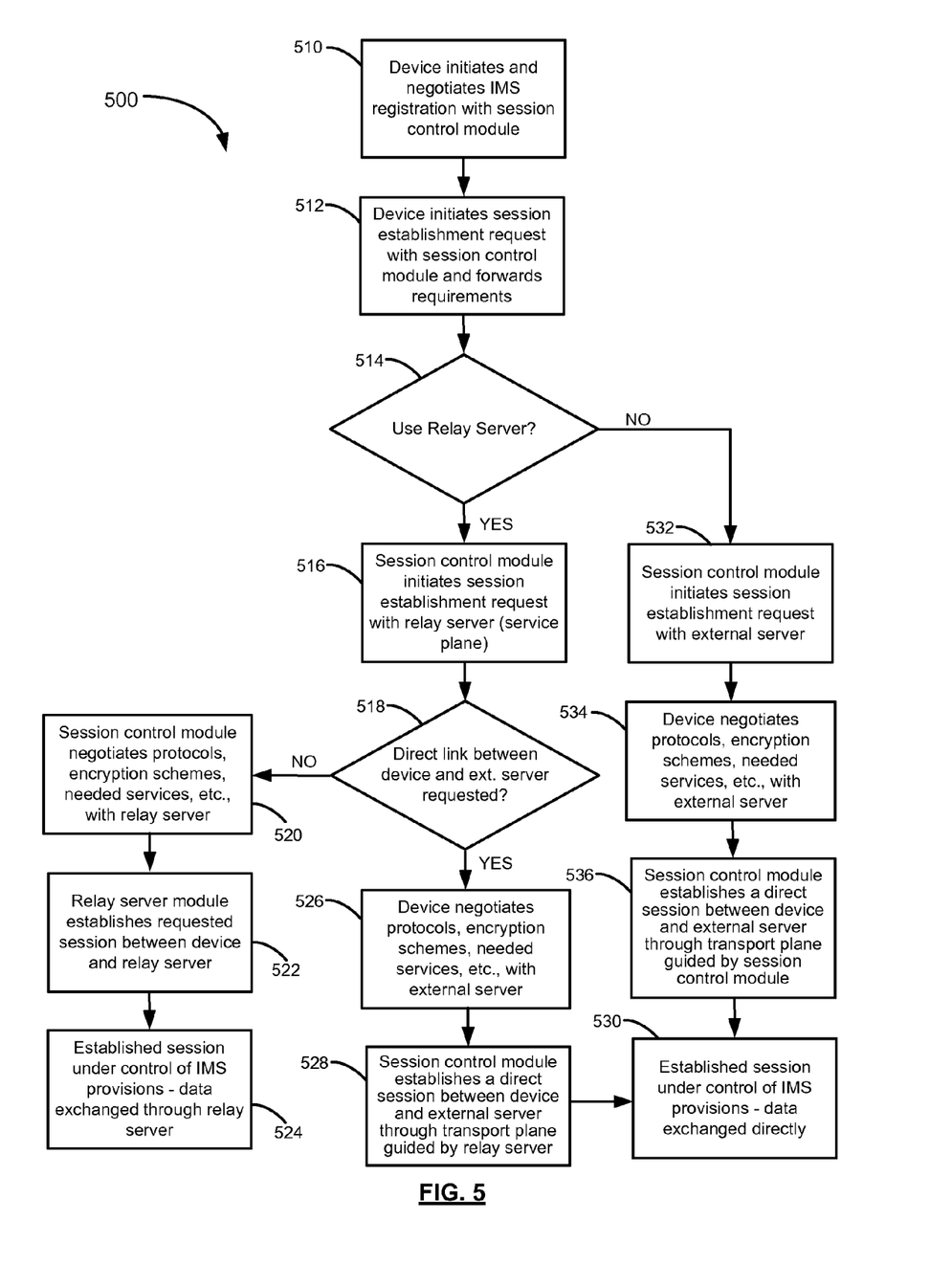
FIG. 5 shows in flow chart form one embodiment of a modified IMS session establishment process for use with the communication system shown in FIG. 2 and the mobile electronic device shown in FIG. 3 according to the modified IMS network configuration shown in FIG. 4.

Reference is next made to FIG. 5, which shows in flow chart form a modified IMS session request and registration process for use with the communication system shown in FIG. 2 and the mobile electronic device shown in FIG. 3 according to the modified IMS network configuration shown in FIG. 4 in accordance with one embodiment. In a first step 510, a mobile electronic device, such as one of the mobile electronic devices 414 shown in FIG. 4, initiates and negotiates IMS registration with the session control module to receive service from a network, such as with the session control module 415, residing in a session control plane, such as the session control plane 408. Once the mobile electronic device is registered, a session may then be established. In a second step 512, the mobile electronic device initiates a session establishment request with the session control module. In one example, such a request may be initiated by the IMS module 348 (FIG. 3) of the mobile electronic device 300 through the WAN 102 and arrive at the wired to wireless gateway 128 and then at the session control module 124 or 415, shown in FIGS. 2 and 4 respectively. Upon making the request, the mobile electronic device also forwards the requirements of the session, such as the desired protocol, encryption scheme, duration (e.g., whether a permanent or transient session is requested), etc. Next, at a step 514, it is determined whether a relay server, such as the relay server module 126 shown in FIG. 2 or the relay server module 418 shown in FIG. 4, residing in a service plane, such as the service plane 406 shown in FIG. 4., is to be used to establish and/or manage the requested session. This determination may be based either on a preference of the user of the mobile electronic device or based on the presence or absence of the relay server in the IMS configuration (such as the IMS architecture 402). If the relay server is to be used, the session control module requests the establishment of the session from the relay server (step 516). The method 500 next determines at a step 518 if a direct link has been requested between the mobile electronic device requesting IMS session establishment and an external server for which communications are destined (e.g., such as the external server 420 shown in FIG. 4). If a direct link has not been requested, the session control module negotiates the requested protocols, encryption schemes, services, and session details with the relay server (step 520). The relay server module establishes the requested session between the mobile electronic device and the relay server module (step 522). Finally, at a step 524, the requested IMS session is active and the session is established under the control of the IMS provisions with data being exchanged between the mobile electronic device and the external server via the relay server. If a permanent session was requested, the session may persist indefinitely. If a transient session was requested, the data to be sent is sent and the session terminated, with the method 500 repeating each time data is to be sent by the mobile electronic device. For a permanent session, the external server remains connected to the relay server and may only need one session with the relay server to service all of the mobile electronic devices. If transient sessions are used by the mobile electronic devices, the external server may also employ a separate transient session with the relay server for each transient session persisting between the mobile electronic devices and the relay server. If, at the step 518, the method 500 had determined that a direct link between the mobile electronic device and the external server was requested, the mobile electronic device negotiates protocols, encryption schemes, and needed services with the external server (step 526). The session control module then establishes a direct session, guided by the relay server, between the mobile electronic device and the external server through the transport plane at a step 528. Communications then proceed directly from the mobile electronic device to the external server through the transport plane (e.g., from the mobile electronic device 414a to the external server 420, using the connection 430 through the wired to wireless gateway 412, shown in FIG. 4). In one embodiment, communications occur bi-directionally using the wired to wireless gateway 412. Finally, at a step 530, the requested IMS session is active and the session is established under the control of the IMS provisions with data being exchanged directly between the mobile electronic device and the external server via the wired to wireless gateway. In one embodiment, if a permanent session was requested, the session between the mobile electronic device and the external server persists indefinitely. In another embodiment, if a transient session was requested, the data to be sent is sent directly and the session terminated, with the method 500 repeating each time data is to be sent or received. If, at the step 514, it was determined that the relay server was not to be used, the session control module initiates session establishment request directly with the external server (step 532). To perform the step 532, the mobile electronic device requesting the direct link with the external server and circumventing use of the relay server must have needed information, such as a destination network address, to directly contact the external server. The mobile electronic device then negotiates protocols, encryption schemes, needed services, etc., with the external server (step 534). Next, at a step 536, the session control module establishes and guides a direct session between the mobile electronic device and the external server through the transport plane. Finally, at the step 530, the requested IMS session is active and the session is established under the control of the IMS provisions with data being exchanged directly between the mobile electronic device and the external server via the wired to wireless gateway. In one embodiment, if a permanent session was requested, the session between the mobile electronic device and the external server persists indefinitely. In another embodiment, if a transient session was requested, the data to be sent is sent directly and the session terminated, with the method 500 repeating each time data is to be sent or received.

Figure 6:
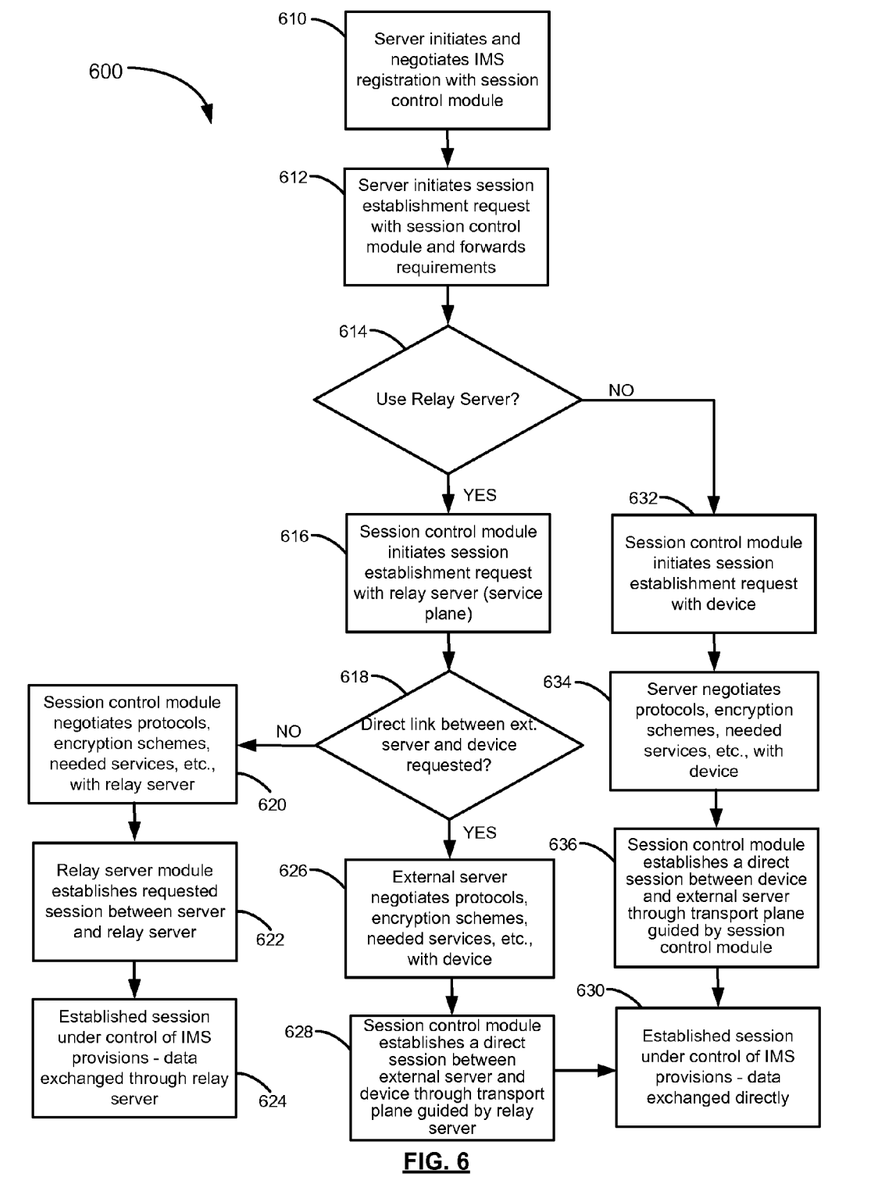
FIG. 6 shows in flow chart form another embodiment of a modified IMS session establishment process for use with the communication system shown in FIG. 2 and the mobile electronic device shown in FIG. 3 according to the modified IMS network configuration shown in FIG. 4.

Reference is next made to FIG. 6 which shows in flow chart form a modified IMS session request and registration process for use with the communication system shown in FIG. 2 and the mobile electronic device shown in FIG. 3 according to the modified IMS network configuration shown in FIG. 4 in accordance with one embodiment. In a first step 610, an external server, such as the external server 420 shown in FIG. 4, initiates and negotiates IMS registration with a session control module, such as the session control module 415, residing in a session control plane, such as the session control plane 408. Once the external server is registered, a session may then be established. In a second step 612, the external server initiates a session establishment request with the session control module. In one example, such a request may be initiated by the IMS module 424 of the external server 424 through the wired to wireless gateway 128 or 412 and then at the session control module 124 or 415, shown in FIGS. 2 and 4 respectively. Upon making the request, the external server also forwards the requirements of the session, such as the desired protocol, encryption scheme, duration (e.g., whether a permanent or transient session is requested), etc. Next, at a step 614, it is determined whether a relay server, such as the relay server module 126 shown in FIG. 2 or the relay server module 418 shown in FIG. 4, residing in a service plane, such as the service plane 406 shown in FIG. 4, is to be used to establish and/or manage the requested session. This determination may be based either on a preference of the external server requesting the session or based on the presence or absence of the relay server in the IMS configuration (such as the IMS architecture 402). If the relay server is to be used, the session control module requests the establishment of the session from the relay server (step 616). The method 600 next determines at a step 618 if a direct link has been requested between the external server requesting an IMS session and one of the mobile electronic devices for which communications are destined (e.g., such as one of the mobile electronic devices 414a and 414b shown in FIG. 4). If a direct link has not been requested, the session control module negotiates the requested protocols, encryption schemes, services, and session details with the relay server (step 620). The relay server module then establishes the requested session between the external server and the relay server module (step 622). Finally, at a step 624, the requested IMS session is established under the control of the IMS provisions with data being exchanged between the mobile electronic device and the external server via the relay server. If a permanent session was requested, the session may persist indefinitely. If a transient session was requested, the data to be sent is sent and the session terminated, with the method 600 repeating each time data is to be sent or received. For a permanent session, the external server remains connected to the relay server and may only need one session with the relay server to service all of the mobile electronic devices. If transient sessions are to be used by the external server, the external server may employ a separate transient session with the relay server for each session persisting between the mobile electronic devices and the relay server. If, at the step 618, the method 600 had determined that a direct link between the external server and the mobile electronic device was requested, the external server then negotiates protocols, encryption schemes, needed services, etc., with the mobile electronic device (step 626). Next, the session control module establishes the requested direct session under the guide of the relay server (step 628). Communications then proceed directly from the external server to the mobile electronic device through the transport plane (e.g., from the external server 420 to the mobile electronic device 414b over the connection 430 using the wired to wireless gateway 412, shown in FIG. 4). In one embodiment, communications occur bi-directionally using the wired to wireless gateway 412. Finally, at a step 630, the requested IMS session is established under the control of the IMS provisions with data being exchanged directly between the mobile electronic device and the external server via the wired to wireless gateway. In one embodiment, if a permanent session was requested, the session between the mobile electronic device and the external server persists indefinitely. In another embodiment, if a transient session was requested, the data to be sent is sent directly and the session terminated, with the method 600 repeating each time data is to be sent or received. If, at the step 614, it was determined that the relay server was not to be used, the session control module initiates session establishment request directly with the mobile electronic device (step 632). To perform the step 632, the external server requesting the direct link with the mobile electronic device and circumventing use of the relay server must have needed information, such as a destination network address, to directly contact the mobile electronic device. The external server then negotiates protocols, encryption schemes, needed services, etc., with the mobile electronic device (step 634). Next, at a step 636, the session control module establishes and guides a direct session between the mobile electronic device and the external server through the transport plane. Finally, at the step 630, the requested IMS session is active and the session is established under the control of the IMS provisions with data being exchanged directly between the external server and the mobile electronic device via the wired to wireless gateway. In one embodiment, if a permanent session was requested, the session between the mobile electronic device and the external server persists indefinitely. In another embodiment, if a transient session was requested, the data to be sent is sent directly and the session terminated, with the method 600 repeating each time data is to be sent or received.

The methods 500 and 600 describe session establishment between the external server and the mobile electronic device, or vice versa. Additionally, using methods substantially similar to the methods 500 and 600, sessions may be established between the external server and the relay server alone and between the mobile electronic devices and the relay server alone. Such session establishments may be initiated by any of the mobile electronic devices, the relay server, or the external server. In one example, the external sever establishes a permanent session with the relay server upon coming online. As mobile electronic devices in the field have information to send to the relay server, the mobile electronic devices individually initiate the establishment of transient sessions with the relay server, send the data, and terminate the sessions as needed. Likewise, when the relay server has relayed information to send to the mobile electronic devices, the relay server initiates the establishment of the necessary transient sessions with the mobile electronic devices as needed, sends the data, and then terminates the sessions.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A system for providing content to a plurality of mobile electronic devices, at least some of the mobile electronic devices having wireless communications capabilities, the system comprising:
    a first network comprising:
        a wireless portion;
        a wired portion;
        a wireless network system for permitting communication with at least some of the mobile electronic devices through wireless sessions;
        a wired to wireless gateway module connected to the wireless network system for interfacing between said wireless portion and said wired portion;
        a session control module interfacing with the wired to wireless gateway module for managing the wireless sessions and wired sessions; and
        a relay server module interfacing with the session control module and the wired to wireless gateway module; and
    a second network comprising:
        an external server for providing data content to the mobile electronic devices, the external server adapted to communicate directly with either the relay server module or the wired to wireless gateway module to induce establishment of a session between said external server and at least one mobile electronic device among said plurality of mobile electronic devices
    the session control module adapted to:
        initiate a session establishment request between the electronic device and one of the mobile electronic devices;
        determine that the relay server is to be used;
        determine that a direct link between the electronic device and the one of the mobile electronic devices has not been requested; and
        establish the requested session between the electronic device and the relay server.

2. The system according to claim 1, wherein the first network is an IP Multimedia Subsystem (IMS) enabled network having a transport plane, a session control plane, and a service plane.

3. The system according to claim 2, wherein the wireless network system and the wired to wireless gateway module are members of the transport plane, the session control module is a member of the session control plane, and the relay server module is a member of the service plane.

4. The system according to claim 3, wherein the external server is a member of the transport plane, is configured as a peer to the mobile electronic devices and communicates with the relay server as IMS-enabled user equipment.

5. The system according to claim 4, wherein the session control module is adapted to:
    receive requests for the wireless sessions from the mobile electronic devices; and
    negotiate aspects of the wireless sessions with the relay server module, the wireless sessions being selected from the group consisting of transient sessions and permanent sessions.

6. The system according to claim 4, wherein the session control module is adapted to:
    receive requests, for one or more wireless sessions, from the external server; and
    negotiate aspects of the wired sessions with the relay server module.

7. The system according to claim 4, further comprising:
one or more servers being members of the session control plane and the service plane, the wired to wireless gateway module, the session control module, and the relay server module being implemented as software modules running on the one or more servers.

8. The system according to claim 7, further comprising:
a server dedicated to and executing the wired to wireless gateway module;
a server dedicated to and executing the session control module and
a server dedicated to and executing the relay server module,
the servers being interconnected by a network and each executing one of the modules.

9. The system according to claim 4, wherein the second network is a private enterprise network and the external server is an email server.

10. The system according to claim 4, wherein the wireless network system comprises:
a wireless network gateway interfacing with the wired to wireless gateway module; and
one or more transceivers coupled to the wireless network gateway.

11. The system according to claim 4, wherein the external server is adapted to communicate with the mobile electronic devices through the wired to wireless gateway module when granted a session to do so by the relay server module or the session control module.

12. A method of establishing a communication session between an electronic device and a communications system, the communications system being arranged to provide content to a plurality of mobile electronic devices, at least some of the mobile electronic devices having wireless communications capabilities, the communications system including:
a first network having:
a wireless network system for communicating with at least some of the mobile electronic devices through wireless sessions;
a wired to wireless gateway module connected to the wireless network system for interfacing between a wireless portion of the first network and a wired portion of the first network;
a session control module interfacing with the wired to wireless gateway module for managing the wireless sessions and wired sessions; and
a relay server module interfacing with the session control module and the wired to wireless gateway module; and
a second network having:
an external server for providing content to the mobile electronic devices through one or more sessions,
the method comprising:
at the session control module, initiating a session establishment request between the electronic device and one of the mobile electronic devices;
determining that the relay server is to be used;
determining that a direct link between the electronic device and the one of the mobile electronic devices has not been requested; and
establishing the requested session between the electronic device and the relay server;
determining session specifications to be applied to the requested session; and
at said session control module, establishing a session between the mobile electronic device and the one of the mobile electronic devices incorporating direct communication between the one of the mobile electronic devices and the relay server module, the session having the session specifications and corresponding to the request.

13. The method according to claim 12, wherein the established session is an IP Multimedia Subsystem (IMS) enabled session.

14. The method according to claim 12, wherein the session is an IP Multimedia Subsystem (IMS) enabled session, with the electronic device being the external server and the external server being treated as a peer to the mobile electronic devices with sessions involving the external server also being IMS enabled sessions.

15. A non-transitory computer readable storage medium storing instructions, which may be executed on a programmed processor to facilitate electronic device session establishment for use with a communications system, the communications system being arranged to provide content to a plurality of mobile electronic devices, at least some of the mobile electronic devices having wireless communications capabilities, the communications system including:
a first network having:
a wireless network system for communicating with at least some of the mobile electronic devices through wireless sessions;
a wired to wireless gateway module connected to the wireless network system for interfacing between a wireless portion of the first network and a wired portion of the first network;
a session control module interfacing with the wired to wireless gateway module for managing the wireless sessions and wired sessions; and
a relay server module interfacing with the session control module and the wired to wireless gateway module; and
a second network having:
an external server for providing content to the mobile electronic devices through one or more sessions,
said instructions causing said processor to:
initiate a session establishment request between the electronic device and one of the mobile electronic devices;
determine that the relay server is to be used;
determine that a direct link between the electronic device and the one of the mobile electronic devices has not been requested; and
establish the requested session between the electronic device and the relay server;
determine session specifications to be applied to the requested session; and
establish a session between the mobile electronic device and the one of the mobile electronic devices incorporating direct communication between the one of the mobile electronic devices and the relay server module, the session having the session specifications and corresponding to the request.

* * * * *